(12) United States Patent
Xu et al.

(10) Patent No.: US 8,937,440 B2
(45) Date of Patent: Jan. 20, 2015

(54) LIGHTING DEVICE AND VOLTAGE REDUCTION METHOD THEREOF

(71) Applicant: Delta Electronics (Shanghai) Co., Ltd., Shanghai (CN)

(72) Inventors: Lizhi Xu, Shanghai (CN); Weiqiang Zhang, Shanghai (CN); Yuanyuan Zhong, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 19 days.

(21) Appl. No.: 13/844,079

(22) Filed: Mar. 15, 2013

(65) Prior Publication Data

US 2014/0103821 A1  Apr. 17, 2014

(30) Foreign Application Priority Data

Oct. 12, 2012  (CN) .......................... 2012 1 0388876

(51) Int. Cl.
*H05B 37/02*  (2006.01)
*G09G 5/10*  (2006.01)
*H05B 33/08*  (2006.01)

(52) U.S. Cl.
CPC ........... *H05B 33/0815* (2013.01); *Y02B 20/341* (2013.01)
USPC ......... 315/250; 315/185 R; 315/188; 315/297

(58) Field of Classification Search
CPC ....... H05B 33/0815; H05B 37/02; G09G 5/10
USPC .............. 315/312, 185 R, 188, 294, 250, 201
See application file for complete search history.

(56) References Cited

U.S. PATENT DOCUMENTS 7,408,308 B2 * 8/2008 Sawada et al. ................ 315/291
8,044,609 B2 * 10/2011 Liu ................................ 315/291

(Continued)

FOREIGN PATENT DOCUMENTS

| CN | 101959344 A | 1/2011 |
|---|---|---|
| DE | 202005006053 U1 | 8/2005 |
| TW | 201001862 A1 | 1/2010 |

OTHER PUBLICATIONS

Intellectual Property Office, Ministry of Economic Affairs, R.O.C., "Office Action", dated Nov. 26, 2014, Taiwan.

*Primary Examiner* — Douglas W Owens
*Assistant Examiner* — Wei Chan
(74) *Attorney, Agent, or Firm* — Tim Tingkang Xia, Esq.; Morris, Manning & Martin, LLP (57) ABSTRACT

The disclosure provides a lighting device and a voltage reduction method thereof, wherein the lighting device comprises: an AC power supply generator for generating an AC power source to supply power to other accessories and circuits in the lighting device; m load components, every two adjacent load components forming one head common connection point and one end common connection point respectively for each load component from head to end alternatively; and (m−1) current balancing cells each respectively connected between one head common connection point or one end common connection point and one of two output terminals of the AC power supply generator; wherein the m load components comprise (m−n) low impedance load components therein. The present application can reduce the output voltage of the AC power supply generator with lower cost.

14 Claims, 6 Drawing Sheets

(56) References Cited

U.S. PATENT DOCUMENTS

| | | | |
|---|---|---|---|
| 8,169,157 B2* | 5/2012 | Lin et al. | 315/294 |
| 8,686,650 B2* | 4/2014 | Shimura | 315/188 |
| 2006/0255753 A1* | 11/2006 | Sawada et al. | 315/312 |
| 2008/0231204 A1* | 9/2008 | Praiswater et al. | 315/192 |
| 2010/0060175 A1* | 3/2010 | Lethellier | 315/164 |
| 2010/0237799 A1* | 9/2010 | Choi et al. | 315/294 |
| 2010/0308738 A1* | 12/2010 | Shteynberg et al. | 315/185 R |
| 2010/0315013 A1* | 12/2010 | Li et al. | 315/185 R |
| 2011/0006689 A1 | 1/2011 | Blanchard et al. | |
| 2011/0075057 A1* | 3/2011 | Kim et al. | 348/790 |
| 2012/0019156 A1* | 1/2012 | Jin | 315/187 |
| 2012/0098442 A1* | 4/2012 | Jin | 315/188 |
| 2013/0077202 A1* | 3/2013 | Chin et al. | 361/91.5 |
| 2013/0134887 A1* | 5/2013 | Li et al. | 315/186 |
| 2013/0300295 A1* | 11/2013 | Blanchard et al. | 315/122 |

* cited by examiner

LIGHTING DEVICE AND VOLTAGE REDUCTION METHOD THEREOF

CROSS-REFERENCE TO RELATED APPLICATIONS

The present application claims priority under 35 U.S.C. §119 to Chinese Patent Application No. 201210388876.9, filed on Oct. 12, 2012, the entire contents of which are incorporated herein by reference.

FIELD OF THE INVENTION

The present application relates to a lighting device, in particular to a lighting device having voltage reduction function and a voltage reduction method thereof.

BACKGROUND OF THE INVENTION

In many of the international safety standards, there are restrictions on output voltages of driving circuits in lighting devices with light emitting diodes (LEDs). Those international safety standards include, for example, IEC 61347-2-13 and UL1310, etc. In IEC 61347-2-13, it's prescribed that output voltages of LED drivers can satisfy the SELV (safety extra-low voltage) requirements only under a condition of the output voltages ≤50V AC RMS or the output voltages ≤120V DC. In UL1310, it's prescribed that output voltages of LED drivers can satisfy the SELV requirements only under a condition of the output voltages ≤42.4V AC RMS or the output voltages ≤60V DC.

However, in some applications, a large number of LEDs are needed so as to satisfy the illumination requirements. In this situation, a plurality of LED clusters need to be connected in parallel with each other, so as to avoid output voltages thereof from going beyond the restrictions of the safety standards. However, the usage of too many LED clusters may cause too many related accessories to be used in the whole system, such that the system is made more complicated, and the cost thereof is greatly increased.

Figure 1:
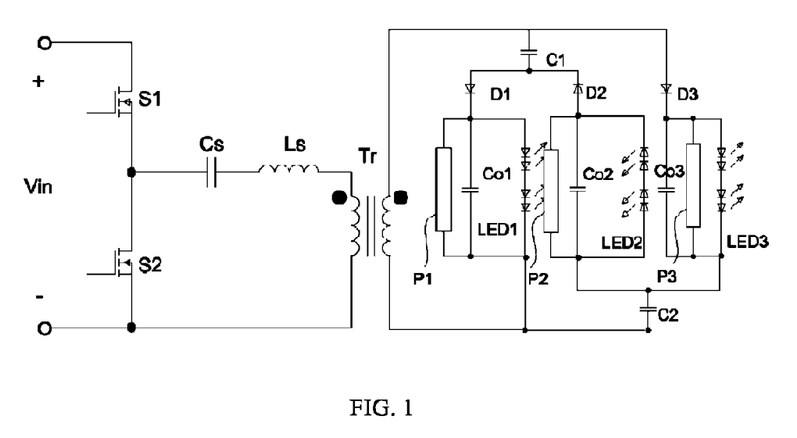
FIG. 1 is a circuit diagram illustrating a driving circuit of a lighting device according to one example of the prior art.

FIG. 1 illustrates a conventional LED lighting device using a plurality of LED clusters, wherein the current balancing cells and their protection circuits on the right of the secondary side of a transformer Tr in an AC power supply generator are all integrated to the side of a LED panel, and the left side circuits are all integrated to the side of the AC power supply generator. The power generated by the AC power supply generator is an alternating current (AC) power to be applied to the accessories and circuits of the lighting device on the right of the secondary side of the transformer Tr. In some cases, since a greater number of LEDs need to be connected in every cluster to satisfy the illumination requirements, the output voltage of the AC current source (namely, the voltage on the secondary output terminal of the transformer) rises higher than a voltage satisfying the SELV requirements. Namely, the output voltage is higher than the upper limit of the safety extra-low voltage prescribed by IEC 61347-2-13 or UL1310, etc.

Figure 2:
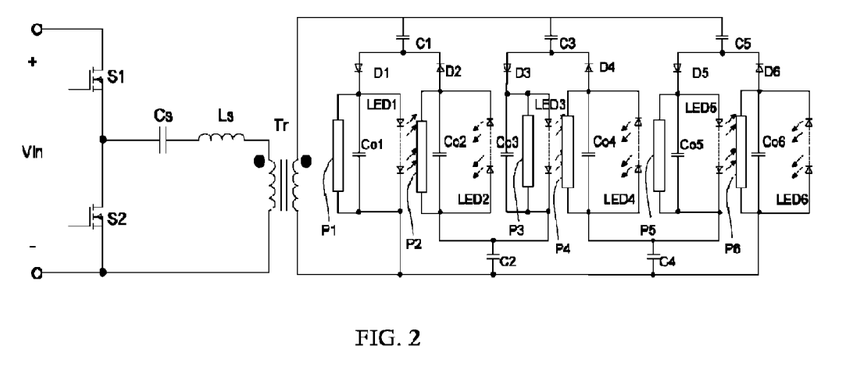
FIG. 2 is a circuit diagram illustrating a driving circuit of a lighting device according to another example of the prior art.

Therefore, the conventional way to solve the problem is to reduce the number of LEDs in every cluster and increase the number of clusters connected in parallel, such that the output voltage of the AC current source can be reduced to meet the SELV requirements, as shown in FIG. 2. However, this may increase the number of the accessories such as filter circuits, protection circuits needed in every LED cluster. Moreover, during a process of standard production, sometimes the number of LEDs in every cluster must keep identity, which may further multiply increase the number of LED clusters connected in parallel together with the number of accessories in every LED cluster, such that the entire cost of the lighting device is greatly increased.

Accordingly, it's a problem that needs to be solved urgently with the lighting device having voltage reduction function to be developed to overcome the above deficiencies in the prior art and to meet the SELV requirements with less cost.

SUMMARY OF THE INVENTION

In order to overcome the deficiencies in the prior art, one object of the present application is to provide a lighting device and a voltage reduction method thereof, for reducing the voltages on both terminals of the AC power supply generator in the lighting device, so as to meet the safety voltage requirements, meanwhile the cost of circuit is not to be increased greatly.

One further object of the present application is to reduce the output voltage on both terminals of the AC power supply generator while satisfying the illumination requirements, so as to comply with the safety standards, and thus the lighting device can work in a normal state.

According to one aspect of the present application, a lighting device comprises: an AC power supply generator for generating an AC power source so as to supply power to other accessories and circuits of the lighting device; m load components, wherein a first load component has one end electrically connected to the AC power supply generator and another end electrically connected to one end of a second load component at a first common connection point; an (i)th load component has one end electrically connected to one end of an (i−1)th load component at an (i−1)th common connection point and another end electrically connected to one end of an (i+1)th load component at an (i)th common connection point; an (m)th load component has one end electrically connected to one end of an adjacent (m−1)th load component at an (m−1)th common connection point and another end electrically connected to the AC power supply generator; and (m−1) current balancing cells each for balancing the current flowing through two of the load components connected thereto, wherein a first current balancing cell is electrically connected between the AC power supply generator and the first common connection point, an (i−1)th current balancing cell is electrically connected between the AC power supply generator and the (i−1)th common connection point, an (i)th current balancing cell is electrically connected between the AC power supply generator and the (i)th common connection point, and an (m−1)th current balancing cell is electrically connected between the AC power supply generator and the (m−1)th common connection point; wherein based on the polarities of the AC power supply generator, every two adjacent load components have opposite polarities and alternatively work in a positive cycle or a negative cycle of the AC power source, and the m load components comprise (m−n) low impedance load components therein to reduce the voltage output from the AC power supply generator, wherein m, n and i are positive integers, and m≥3, m>n≥1, m>i>1.

According to an embodiment, wherein the m load components further comprise n illuminant load components, each of the low impedance load components has a low impedance load with an impedance value less than that of the illuminant load in any of the illuminant load components.

According to an embodiment, wherein each of the illuminant load components comprises: an LED group formed of one or more LEDs connected in series with each other; a filter circuit connected in parallel with the LED group; and a protection circuit connected in parallel with the LED group.

According to an embodiment, wherein each of the load components comprises a rectifier cell connected in series and in the same polarity with the illuminant load in the illuminant load component or the low impedance load in the low impedance load component.

According to an embodiment, wherein the rectifier cell is a rectifier diode.

According to an embodiment, wherein each of the load components has the same current flowing therethrough.

According to an embodiment, wherein the low impedance load in the low impedance load component is a wire or a forward conductive diode.

According to an embodiment, wherein each of the current balancing cells is a capacitor.

According to an embodiment, wherein the (m−n) low impedance load components are positioned on one side of the n illuminant load components, or the (m−n) low impedance load components are divided into two groups and respectively positioned on both sides of the n illuminant load components.

According to an embodiment, wherein the AC power supply generator is made of a resonance DC-AC converter.

According to an embodiment, wherein the resonance DC-AC converter comprises: a half-bridge switching circuit formed of two switching elements connected in series with each other, for transforming the DC input voltage into DC square waves to be output from a common connection point of the two switching elements; and a resonance groove formed of a resonance capacitor, a resonance inductance and a transformer connected in series with each other, for receiving the DC square waves from the half-bridge switching circuit and transforming them into an AC current source to be output from the secondary side of the transformer to the load components.

According to an embodiment, wherein when the (m−n) low impedance load components were not provided, each of the n illuminant load components had a first current flowing therethrough, and the AC power supply generator output a first voltage; when the (m−n) low impedance load components are provided, the output current of the AC power supply generator is adjusted to m/n times of the first current, such that each of the m load components has a second current which equals to the first current, and the AC power supply generator outputs a second voltage which is reduced to n/m times of the first voltage.

According to another aspect of the present application, a voltage reduction method for a lighting device may comprise steps of: providing (m−n) low impedance load components in m load components to form the lighting device according to any one described above, wherein the low impedance load components are used to reduce the output voltage of the AC power supply generator in the lighting device.

According to an embodiment, wherein the method further comprises steps of: providing n illuminant load components in the m load components, when the (m−n) low impedance load components were not provided, each of the n illuminant load components had a first current flowing therethrough, and the AC power supply generator output a first voltage; when the (m−n) low impedance load components are provided, the output current of the AC power supply generator is adjusted to m/n times of the first current, such that each of the m load components has a second current which equals to the first current, and the AC power supply generator outputs a second voltage which is reduced to n/m times of the first voltage.

The present application provides at least one of the low impedance load components to the plurality of illuminant load components in the lighting device, those low impedance load components are used as voltage reduction circuit to reduce the output voltage on the output terminal of the AC power supply generator in the lighting device, thus the safety requirements in power utilization are able to be satisfied. The present application can reduce the output voltage on both ends of the AC power supply generator while satisfying the illumination requirements, so as to be in compliance with the safety standards, and thus the lighting device can work in a normal state. The lighting device of the present application has advantages such as simple structure, easy configuration and usage, and lower cost.

BRIEF DESCRIPTION OF THE DRAWINGS

The details of the configurations and the embodiments will be described below with reference to the accompanying drawings, in which like reference numbers will be used to refer to like parts.

DESCRIPTION OF THE EMBODIMENTS

A plurality of embodiments of the present application will be described in detail in conjunction with the accompanying drawings. The details of the plurality of embodiments will be illustrated together in the following depiction for clarity. However, it should be known that the details of the embodiments described herein are not intended to limit the present application.

The dimensions of each element may be magnified, omitted or schematically illustrated in the drawings for clarity or convenience of depiction. Also, the dimensions of each element may not necessarily be illustrated proportionally.

Figure 3:
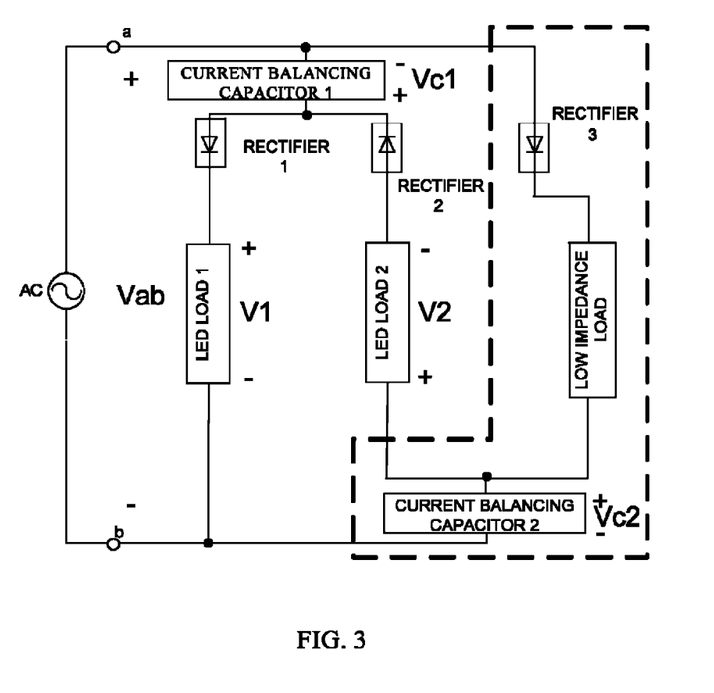
FIG. 3 is a diagram showing the principle of a lighting device according to a first embodiment of the present application.

FIG. 3 is a diagram showing the principle of a lighting device according to a first embodiment of the present application.

For the lighting device formed of a plurality of LED groups connected in parallel, various current balancing technologies about LED groups have been developed and employed in the present technical field to solve the problem of non-uniform current flowing through the LED clusters. The applicant of the present application has filed a Chinese Patent Application No. 201210106272.0 on Apr. 11, 2012 entitled "current balancing circuit", which disclosed a current balancing circuit using the Amp-Second Balance property of a capacitor to form the parallel connection between a plurality of LED clusters. The lighting device of the present application is further developed based on that current balancing circuit.

The circuit structures shown in FIG. 1 and FIG. 2 basically illustrate the configuration and connection relationship of the current balancing circuit in aforementioned application. In general, the aforementioned current balancing circuit has a work principle of: a plurality of current balancing capacitors are respectively connected in sequence between one of the first and second output terminals of the AC power source in the lighting device and one of the common connection points of every two adjacent LED clusters in contrary directions and connected from head to end in sequence. Because of the electric charge balancing property of a capacitor, the average current flowing forward through each current balancing capacitor may be the same as that flowing backward through the current balancing capacitor, thus causing the average currents on the adjacent two LED load clusters identical to each other.

The lighting device of the present application is to add a voltage reduction function to the above current balancing circuit.

As shown in FIG. 3, the LED lighting device of the present application may comprise: an AC power supply generator for generating an AC current source so as to supply power to other accessories and circuits in the lighting device; current balancing capacitors 1~2 respectively provided on two output terminals of the AC power supply generator; two illuminant load components (referred as LED load components later) connected from head to end in contrary directions, respectively comprising an LED group formed of many LEDs, a filter circuit and a protection circuit (shown as LED load 1 and LED load 2 in FIG. 3), wherein one end of the component of the LED load 1 connects with one end of the component of the LED load 2 to form a common connection point which is to be connected to one of the output terminals of the AC power supply generator via a current balancing capacitor 1, and the other end of the component of the LED load 1 connects with another output terminal of the AC power supply generator, and the other end of the component of the LED load 2 connects with said another output terminal of the AC power supply generator via a current balancing capacitor 2; and a low impedance load component comprising a low impedance load. Here, the low impedance load has an impedance value evidently lower than that of the LED load of the normally worked LED load component. For example, the impedance value of the low impedance load may be about ⅓ or less of the impedance value of the LED load 1 or the LED load 2 in the lighting device, even almost down to zero. The low impedance load may be a wire or a forward conductive diode or the like, for example.

The lighting device of the present application may further comprise rectifier cells (for example, rectifiers 1~3 as shown in FIG. 3) each being connected in one of the low impedance load components as well as in one of the LED load components. Specifically, a rectifier 1 is connected in series to the LED load 1 in the same conductive direction of the LEDs therein, a rectifier 2 is connected in series to the LED load 2 in the same conductive direction of the LEDs therein which is reverse to that of the rectifier 1, and a rectifier 3 is connected in series to the low impedance load in a reverse direction to that of the rectifier 2. This configuration is to ensure that the LED load 1 as well as the low impedance load work normally in the positive half cycle of the AC power source, and the LED load 2 works normally in the negative half cycle of the AC power source. The current balancing capacitor 1 and the current balancing capacitor 2 balance the average current flowing through the LED load 1, the LED load 2 and the low impedance load, such that the average currents thereof are identical.

Because of the Amp-Second Balance property of the current balancing capacitors 1~2, the average current values flowing through the LED loads 1~2 and the low impedance load are identical, and voltage V1 on the LED load 1 is substantially identical to voltage V2 on the LED load 2 in value but in contrary directions. If the low impedance load component marked in dashed lines in FIG. 3 were not provided and the LED loads 1~2 were working in a normal state, the LED load 1 or the LED load 2 had voltages to be expressed as V1=V2=Vo, and the current flowing through the LED load 1 or the LED load 2 were Io, then the voltage Vab on the output terminals of the AC power supply generator were Vo. When the low impedance load component is connected thereto, by adjusting the configuration of the AC power supply generator, the output current of the AC power supply generator is changed to be 3/2 times of output current Io of the AC power supply generator (output current Io was obtained when the low impedance load component was not provided), such that the current flowing through the LED load 1 or 2 is kept unchanged (namely, equal to the current Io flowing through respective LED loads 1~2 as if the low impedance load component were not provided), and the current flowing through the low impedance load component is Io too. Since the voltage on the low impedance load is remarkably lower than that on the LED loads 1~2 to an extent which is able to be neglected, the voltage V1 on the LED load 1 and the voltage V2 on the LED load 2 remain the same as Vo in value but in contrary directions. In this way, Vab, Vc1, Vc2, V1 and V2 may form an equation group comprising the following formulas:

$Vab = Vc2$ $Vab = Vc1 + V1$ $-Vab = Vc1 + Vc2 + V2$ $V1 = -V2 = Vo$ wherein Vc1 is a voltage on the current balancing capacitor 1, and Vc2 is a voltage on the current balancing capacitor 2.

By calculating the above equation group, it's known that a positive DC bias voltage Vc2 may be generated on the current balancing capacitor 2 to be expressed as Vc2=(⅔)*Vo, and a negative DC bias voltage Vc1 may be generated on the current balancing capacitor 1 to be expressed as Vc1=-(⅓)*Vo. Those two DC bias voltages may cause the voltage Vab on the output terminals to be expressed as Vab=(⅔)*Vo, thereby to realize the voltage reduction. Moreover, for each of the LED loads 1~2, the work current and voltage thereof may be kept unchanged before and after the low impedance load component is provided thereto, therefore they are able to be working in a normal state.

It should be pointed out that, when a higher illumination requirement is needed, the number of the LED loads or the number of LEDs in every LED load may be increased in the lighting device. When the number of the LED loads is increased, the accessories such as filter circuits and protection circuits in the LED loads need to be increased either, which may increase the entire cost of the lighting device. When the number of LEDs in every LED load is increased, the output current of the AC power supply generator needs to be kept unchanged to ensure the lighting device working normally, thus the current flowing through every LED load is kept unchanged (i.e., equals to Io), while the voltage on both ends of the LED load rises higher because of the increased number of LEDs in every LED load, thus causing the output voltage of the AC power supply generator to be higher (i.e., greater than Vo). At this time, the low impedance load component may be provided to the lighting device to reduce the output voltage of the AC power supply generator (i.e., less than or equal to Vo), so as to comply with the safety standards.

Accordingly, when the number of LEDs in every LED load is increased in an original lighting device to meet the higher illumination requirements, the low impedance load components are used to reduce the output voltage of the AC power supply generator, so as not to go beyond the limitation of the safety standards under a condition that the lighting device works normally, thus improving the safety of the lighting device and making the illumination system to be configured and installed easily. Meanwhile, when the low impedance loads are provided, no additional filter circuit or protection circuit needs to be added, thus greatly reducing the cost.

It should be noted that, in the embodiments as above and the embodiments of the present application to be described later, the equal marks in the formulas and the equivalence relations of voltages and currents in the circuits of the lighting device are actually approximate equivalence, where the factors such as signal errors, impedances of the wires and the low impedance loads in the circuits, and the power loss of the circuits should be considered in practical operations.

Figure 4:
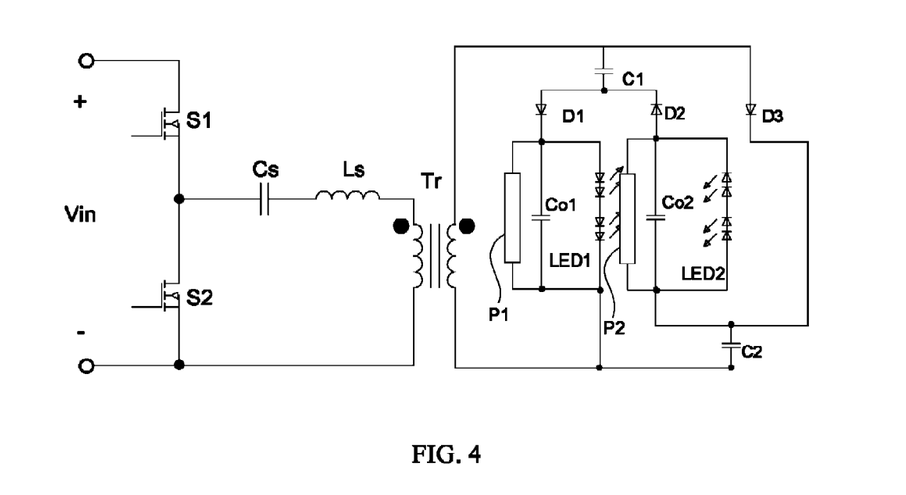
FIG. 4 is a circuit diagram illustrating an example of the lighting device according to the first embodiment of the present application.

FIG. 4 is a circuit diagram illustrating an example of the lighting device based on the principle diagram of FIG. 3. In the lighting device as shown in FIG. 4, the AC power supply generator may comprise a DC input voltage Vin and a resonance DC-AC converter. The resonance DC-AC converter may comprise: a half-bridge switching circuit formed of two switching elements S1 and S2 for transforming the DC input voltage Vin into DC square waves; and a resonance groove formed of a resonance inductance Ls, a resonance capacitor Cs and a transformer Tr for receiving the DC square waves from the half-bridge switching circuit and transforming them into an AC current source to be output from the secondary side of the transformer Tr, so as to supply power to the accessories and the circuits on the right side.

The lighting device may further comprise current balancing capacitors C1~C2, rectifier diodes D1~D3, two LED load components and one low impedance load component, wherein the low impedance load component has a low impedance load which is made of a wire. The LED load components may respectively comprise filter capacitors Co1~Co2, protection circuits P1~P2, and a LED cluster formed of a plurality of LEDs (marked as LED 1 and LED 2 in FIG. 4).

As shown in FIG. 4, the current flowing through the low impedance load component comprising a rectifier diode D3 may be the same as that of the LED 1 component and the LED 2 component, where most of the voltage is only given to the current balancing capacitor C2 on the low impedance load component, thus a DC bias voltage which is positive upward and negative downward is generated on the current balancing capacitor C2. Based on the same formulas as in above equation group, it can be calculated that the DC bias voltage on the current balancing capacitor C2 equals to (⅔)*Vo. Similarly, a DC bias voltage which is negative upward and positive downward is generated on the current balancing capacitor C1, which equals to −(⅓)*Vo. Those two DC bias voltages may cause the output voltage on the secondary side of the transformer Tr less than the voltage on the LED load 1 or LED load 2. Namely, the output voltage on the secondary side equals to (⅔)*Vo, thus realizing the voltage reduction function.

Figure 5:
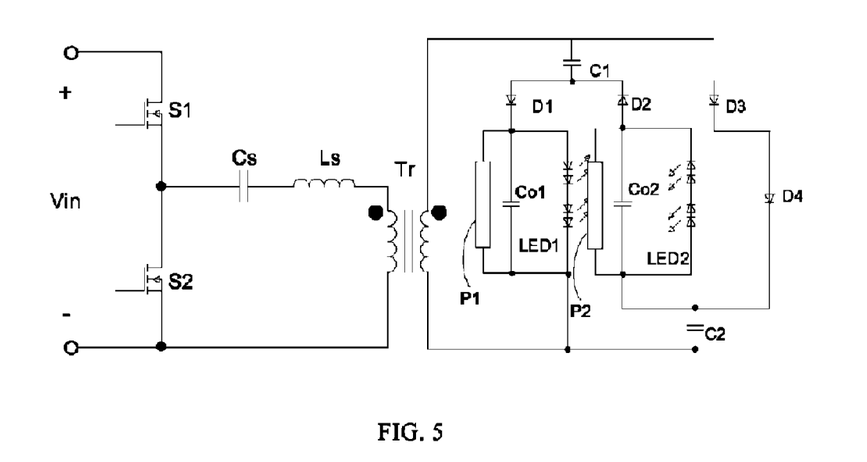
FIG. 5 is a circuit diagram illustrating another example of the lighting device according to the first embodiment of the present application.

FIG. 5 is a circuit diagram illustrating another example of the lighting device based on the principle diagram of FIG. 3. It differs from the lighting device shown in FIG. 4 in that, the low impedance load connected in series with the rectifier diode D3 is changed from a wire to a diode D4 connected in series in the same polarity of the rectifier diode D3, which means the diode D4 has the same polarity as that of the LED 1.

As shown in FIG. 5, the current flowing through the low impedance load component formed of a rectifier diode D3 and a load diode D4 may be the same as that of the LED 1 or LED 2, where most of the voltage is only given to the current balancing capacitor C2 on the low impedance load component. Based on the same formulas as in above equation group, it can be calculated that a DC bias voltage which is positive upward and negative downward is generated on the current balancing capacitor C2 and equals to (⅔)*Vo. Similarly, a DC bias voltage which is negative upward and positive downward is generated on the current balancing capacitor C1 and equals to −(⅓)*Vo. Those two DC bias voltages may cause the output voltage on the secondary side of the transformer Tr less than the voltage on the LED 1 or LED 2. Namely, the output voltage on the secondary side equals to (⅔)*Vo, thus realizing the voltage reduction function.

Figure 6:
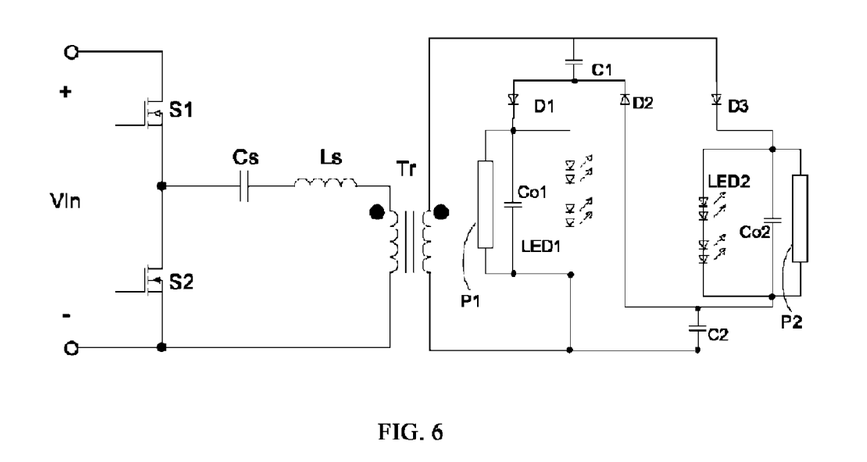
FIG. 6 is a circuit diagram illustrating the lighting device according to a second embodiment of the present application.

FIG. 6 illustrates the lighting device according to a second embodiment of the present application. It differs from the lighting device shown in FIG. 4 in that, the LED 2 load is to be connected in series with the rectifier diode D3, and the low impedance load (for example, a wire) once connected in series with the rectifier diode D3 is now to be connected in series with the rectifier diode D2. The configuration of the AC power supply generator in the lighting device is the same as that of the first embodiment of the present application, which means that, after the low impedance load component is provided, the output current of the AC power supply generator also needs to be raised to 3/2 times of the output current Io of the AC power supply generator as if the low impedance load component were not provided, such that the current on each of the load components is kept unchanged.

As shown in FIG. 6, the current flowing through the low impedance load component formed of the rectifier diode D2 may be the same as that of the LED 1 or LED 2, where most of the voltage is only given to the current balancing capacitors C1~C2 on the low impedance load component. Based on the same formulas as in above equation group, it can be calculated that two DC bias voltages which are negative upward and positive downward are respectively generated on the current balancing capacitors C1~C2 and equal to −(⅓)*Vo. Those two DC bias voltages may cause the output voltage on the secondary side of the transformer Tr less than the voltage on the LED loads. Namely, the output voltage on the secondary side equals to (⅔)*Vo, thus realizing the voltage reduction function.

Figure 7:
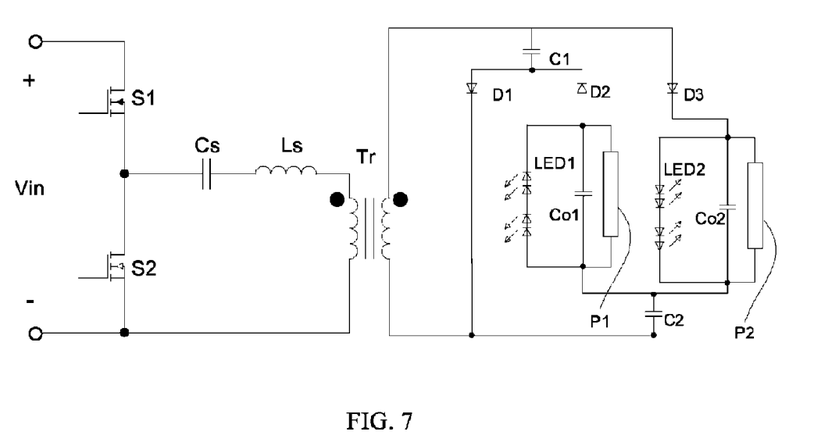
FIG. 7 is a circuit diagram illustrating the lighting device according to a third embodiment of the present application.

FIG. 7 illustrates the lighting device according to a third embodiment of the present application. It differs from the lighting device shown in FIG. 6 in that, the LED 1 load is to be connected in series with the rectifier diode D2, and the wire used as the low impedance load once connected in series with the rectifier diode D2 is now to be connected in series with the rectifier diode D1. The configuration of the AC power supply generator in the lighting device is the same as that of the first and second embodiments of the present application, which means that, after the low impedance load component is provided, the output current of the AC power supply generator also needs to be raised to 3/2 times of the output current Io of the AC power supply generator as if the low impedance load component were not provided, such that the current on each of the load components is kept unchanged.

As shown in FIG. 7, the current flowing through the low impedance load component comprising a rectifier diode D1 may be the same as that of the LED 1 or LED 2, where most of the voltage is only given to the current balancing capacitor C1 on the low impedance load component. Based on the same formulas as in above equation group, it can be calculated that a DC bias voltage which is positive upward and negative downward is generated on the current balancing capacitor C1 and equals to $(2/3)*Vo$. Similarly, a DC bias voltage which is negative upward and positive downward is generated on the current balancing capacitor C2 and equals to $-(1/3)*Vo$. Those two DC bias voltages may cause the output voltage on the secondary side of the transformer Tr less than the voltage on the LED 1 or LED 2. Namely, the output voltage on the secondary side equals to $(2/3)*Vo$, thus realizing the voltage reduction function.

Figure 8:
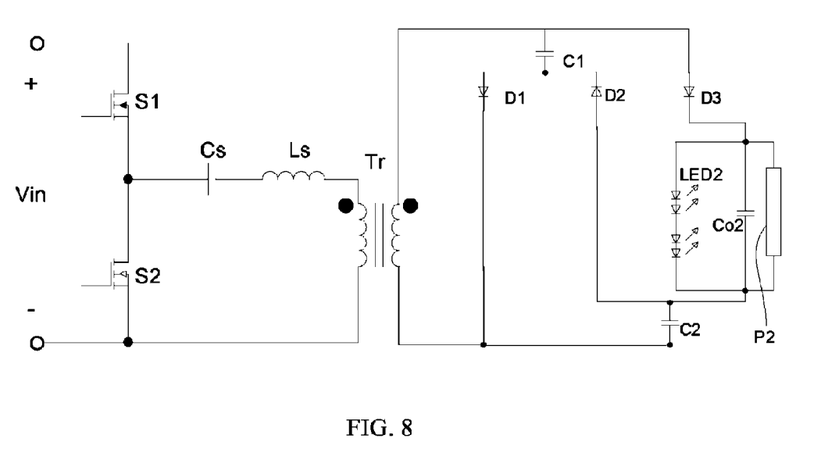
FIG. 8 is a circuit diagram illustrating the lighting device according to a fourth embodiment of the present application.

FIG. 8 illustrates the lighting device according to a fourth embodiment of the present application. It differs from the lighting device shown in FIG. 7 in that, the LED load 1 is also replaced by a wire of the low impedance load. The configuration of the AC power supply generator in the lighting device is the same as that of the first to third embodiments of the present application, only that, after the low impedance load component is provided, the output current of the AC power supply generator needs to be raised to 3 times of the output current Io of the AC power supply generator as if the low impedance load components were not provide, such that the current on each of the load components is kept unchanged.

As shown in FIG. 8, the current flowing through each of the two impedance load components respectively comprising rectifier diodes D1 and D2 may be the same as that of the LED2, where most of the voltage is only given respectively to the current balancing capacitors C1 and C2 on the low impedance load component. Based on the same formulas as in above equation group, it can be calculated that a DC bias voltage which is positive upward and negative downward is generated on the current balancing capacitor C1 and equals to $(1/3)*Vo$. Similarly, a DC bias voltage which is negative upward and positive downward is generated on the current balancing capacitor C2 and equals to $-(2/3)*Vo$. Those two DC bias voltages may cause the output voltage on the secondary side of the transformer Tr less than the voltage on the LED. Namely, the output voltage on the secondary side equals to $(1/3)*Vo$, thus realizing the voltage reduction function.

Figure 9:
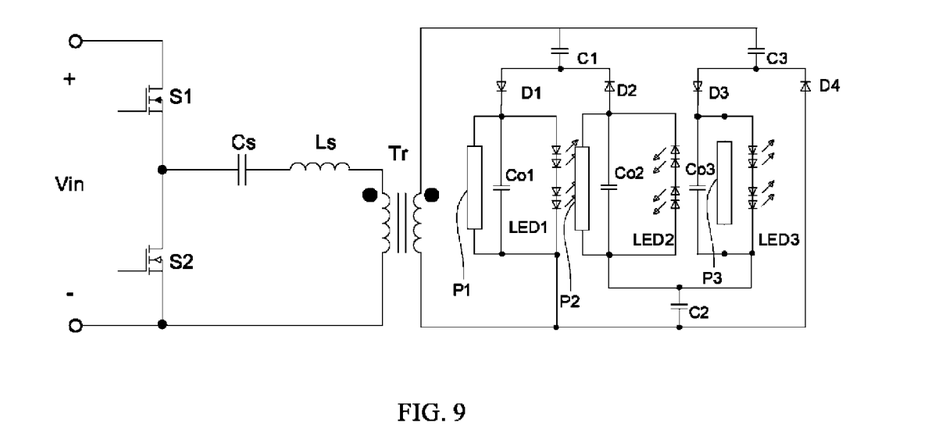
FIG. 9 is a circuit diagram illustrating the lighting device according to a fifth embodiment of the present application.

FIG. 9 illustrates the lighting device according to a fifth embodiment of the present application. The lighting device comprises current balancing capacitors C1~C3, rectifier diodes D1~D4, three LED load components comprising filter capacitors Co1~Co3, protection circuits P1~P3 and LED groups (LED1, LED 2 and LED3 shown in FIG. 9) each formed of a LED cluster, and a low impedance load component comprising a wire. The configuration of the AC power supply generator in the lighting device is the same as that of the first to fourth embodiments of the present application, only that, after the low impedance load component is provided, the output current of the AC power supply generator needs to be raised to 4/3 times of the output current Io of the AC power supply generator as if the low impedance load component were not provided, such that the current on each of the load components is kept unchanged.

As shown in FIG. 9, the current flowing through each of the low impedance load component comprising a rectifier diode D4 may be the same as that of the LED1, LED2 or LED3, where most of the voltage is only given to the current balancing capacitors C3 on the low impedance load component. Based on the same formulas as in above equation group, it can be calculated that a DC bias voltage which is negative upward and positive downward is generated on the current balancing capacitor C3 and equals to $-(3/4)*Vo$. Similarly, a DC bias voltage which is positive upward and negative downward is generated on the current balancing capacitor C2 and equals to $(2/4)*Vo$, and a DC bias voltage which is negative upward and positive downward is generated on the current balancing capacitor C1 and equals to $-(1/4)*Vo$. Those DC bias voltages may cause the output voltage on the secondary side of the transformer Tr less than the voltage on the LED. Namely, the output voltage on the secondary side equals to $(3/4)*Vo$, thus realizing the voltage reduction function.

It can be seen from the above embodiments that the lighting device of the present application with a voltage reduction function is developed on the basis of the aforementioned current balancing circuit disclosed in Chinese Patent Application No. 201210106272.0. The technical solution of the present application may be comprehended as, in the plurality of LED load components in above current balancing circuit, one or more low impedance loads may used to replace one or more original LED loads in the LED load components, so as to form one or more low impedance load components. In a condition that the work currents on the remained plurality of LED load components are kept unchanged, the voltage output at two terminals of the AC power supply generator may be reduced due to the low impedance load components, thus realizing the voltage reduction function to some extent.

Alternatively, the technical solution of the present application may otherwise be comprehended as, in the case that the number of the plurality of LED load components in above current balancing circuit are kept unchanged, one or more low impedance load components may be additionally added to follow the similar connection relations of the load components. Namely, common connection points are sequentially formed between every two adjacent low impedance load components or between one LED load component and one low impedance load component adjacent from each other from head to end, and current balancing capacitors are respectively connected between one of the common connection points and one of the output terminals of the AC power supply generator. In a condition that the work current on each of the load components is kept unchanged, by raising the output current of the AC power supply generator, as if the low impedance load components were not added, the voltage output on two terminals of the AC power supply generator may be lowered due to the low impedance load components, thus realizing the voltage reduction function to some extent.

Figure 10:
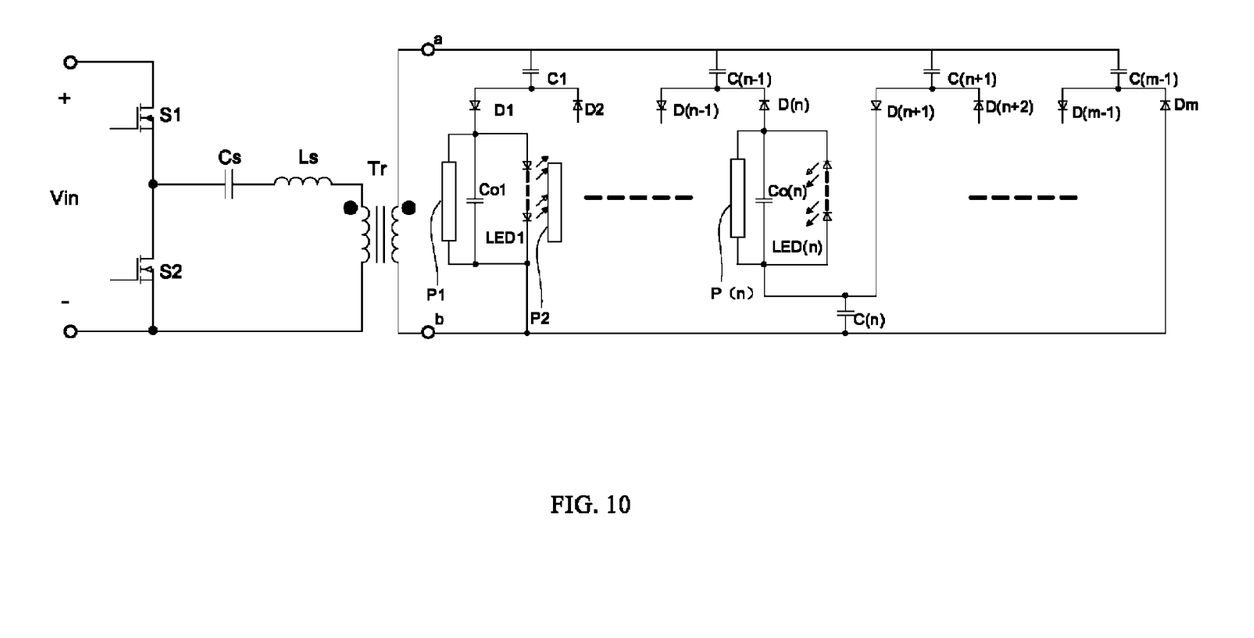
FIG. 10 is a circuit diagram illustrating the lighting device according to a sixth embodiment of the present application.

In summary, on the ground of following the above circuit configuration and connection relationship, one more general embodiment (a sixth embodiment) of the present application may be constructed. FIG. 10 is a circuit diagram illustrating the lighting device according to the sixth embodiment of the present application. The configuration of the AC power supply generator in the lighting device follows the same principle as that of the first to fifth embodiments of the present application.

According to the embodiments of the present application, a lighting device comprises: an AC power supply generator for generating an AC power source so as to supply power to other accessories and circuits in the lighting device; m load components, wherein a first load component has one end electrically connected to the AC power supply generator and another end electrically connected to one end of a second load component at a first common connection point; an (i)th load component has one end electrically connected to one end of a (i−1)th load component at an (i−1)th common connection point and another end electrically connected to one end of an (i+1)th load component at an (i)th common connection point; an (m)th load component has one end electrically connected to one end of an adjacent (m−1)th load component at an (m−1)th common connection point and another end electrically connected to the AC power supply generator; and m−1 current balancing cells for balancing the output current flowing through the m load components coming from the AC power supply generator, wherein a first current balancing cell is electrically connected between the AC power supply generator and the first common connection point, an (i−1)th current balancing cell is electrically connected between the AC power supply generator and the (i−1)th common connection point, an (i)th current balancing cell is electrically connected between the AC power supply generator and the (i)th common connection point, and an (m−1)th current balancing cell is electrically connected between the AC power supply generator and the (m−1)th common connection point; wherein based on the polarities of the AC power supply generator, every two adjacent load components have opposite polarities and alternatively work in a positive cycle or a negative cycle of the AC power source; wherein the m load components comprise (m−n) low impedance load components therein to reduce the voltage output from the AC power supply generator, wherein m, n and i are positive integers, and m≥3, m>n≥1, m>i>1.

Specifically, as shown in FIG. 10, suppose that the lighting device of the present application comprises m load components each comprising at least one rectifier cell connected in series with a load in the load component, and one head common connection point and one end common connection point are alternatively formed for each one of the adjacent two load components from head to end. In the m load components there are n illuminant load components for the lighting device and (m−n) low impedance load components with low impedance loads therein to be made of, for example, wires or forward conductive diodes.

The lighting device further comprises (m−1) current balancing cells each respectively connected between one of the head common connection point and the end common connection point and one of two output terminals of the AC power supply generator in the lighting device, wherein the current balancing cells connected to the head common connection points are connected to the first output terminal of the AC power supply generator, and the current balancing cells connected to the end common connection points are connected to the second output terminal of the AC power supply generator.

The low impedance loads in the (m−n) low impedance load components have impedances apparently lower than that of the other load components in the m load components. The impedances of the low impedance load may be ⅓ or less of that of the other load components (i.e., the illuminant load impedances), even almost down to zero.

According to the embodiments of the present application, each of the (m−1) current balancing cells may be one of the current balancing capacitor C1~C (m−1).

According to the embodiments of the present application, in every two adjacent load components forming one common connection point, the rectifier cell on one load component has a conductive direction which is opposite to that of the rectifier cell on another load component. Namely, suppose that as to the two load components forming one common connection point, the rectifier cell on one load component has a conductive direction which is from the common connection point to another end of this load component, and the rectifier cell on another load component has a conductive direction which is from one end of this load component to the common connection point.

According to the embodiments of the present application, each of the rectifier cells may be one of the rectifier diodes D1~D (m).

The n illuminant load components of the lighting device may comprise: LED groups which are LED clusters LED1~LED (n) respectively formed of LEDs connected in series with each other; filter circuits (for example, filter capacitors) Co1~Co (n), respectively connected in parallel with the LED groups LED1~LED (n); and protection circuits P1~P (n) respectively connected in parallel with the LED groups.

When the low impedance load component were not provided, the output voltage Vab of the AC power supply generator were equal to 1/n times of the sum of the load voltages on the LED groups of the n illuminant load components, namely, equal to one voltage (supposed to be Vo) on two sides of every illuminant load component. If this voltage failed to meet the low voltage requirements, the (m−n) low impedance load components are to be connected as shown in FIG. 10, and the output current of the AC power supply generator is raised to m/n times of original one, such that the current on each of the m load components is kept unchanged. In this way, the work state of each LED load cluster is kept unchanged, while the AC voltage Vab output from the secondary side of the transformer Tr is expressed as Vab=(n/m)*Vo, thus realizing the voltage reduction function.

It should be pointed out that, the (m−n) low impedance load components may be set randomly, namely, in arbitrary positions of the m load components. However, the (m−n) low impedance load components are preferred to be positioned on one of both sides of the n illuminant load components, or to be divided into two groups and respectively positioned on both sides of the n illuminant load components, for a reason that if the LED loads were on both sides of the m load components, the filter capacitors would have to need higher requirements. Accordingly, the n LED loads are to be positioned in the middle of the m load components to lower the requirements of the filter capacitors.

For the lighting device with those illuminant load components formed of a plurality of LED clusters, a typical and also most common application on voltage reduction function is m=8 and n=6, which is in usage of 6 LED load components plus 2 low impedance load components. However, the embodiments of the present application are not limited thereto, and usages of m=3 and n=1, m=3 and n=2 or the like are relatively common.

Theoretically, the number (m−n) of the low impedance load components may be an arbitrary integer less than m. For example, when m=10 and n=1, thus (m−n)=9. However, the number (m−n) of the low impedance load component may be preferably set such that the output voltage of the AC power supply generator can be reduced exactly below the safety voltage threshold. More additional low impedance load components are not necessary because they may cause extra power consuming for the whole lighting device.

For example, as shown in FIGS. 3-10, the voltage on the output terminals of the AC power supply generator, the voltage on both sides of the LED groups, and the voltage on both sides of the current balancing capacitors and the like have polarities illustrated in accordance with the positive cycle of the current output from the AC power supply generator (the output voltage of the AC power supply generator is positive upward and negative downward). When the current output from the AC power supply generator is in a negative cycle, those above polarities are opposite to that shown in FIGS. 3-10.

The AC power supply generator, the LED load components, the low impedance load components, the current balancing cells and the rectifier cells of the present application are implemented not to be limited to the above embodiments, and may be implemented otherwise.

The lighting device of the present application may be other types of lighting device than the LED lighting device, which may be, for example, OLED lighting device or the like.

According to one embodiment of the present application, a voltage reduction method for the lighting device may comprise steps of: providing the low impedance load components of the lighting device as above to reduce the output voltage of the AC power supply generator. In the lighting device, in a case that the work currents on the n illuminant load components are kept unchanged as if the (m−n) low impedance load components were not provided, the output voltage of the AC power supply generator is to be reduced n/m times of the output voltage as if the (m−n) low impedance load component were not provided, when the (m−n) low impedance load components are connected to the n illuminant load components to form the m load components, wherein m and n are positive integers, and m≥3, n≥1, m>n.

Specifically, the voltage reduction method for the lighting device may comprise steps of: providing the (m−n) low impedance load components in the m load components to form the lighting device described as above, wherein the low impedance load components are used to reduce the output voltage of the AC power supply generator in the lighting device.

The method may further comprise steps of: providing the n illuminant load components in the m load components, when the (m−n) low impedance load components were not provided, each of the n illuminant load components had a first current (namely, Io) thereon, and the AC power supply generator output a first voltage (namely, Vo). When the (m−n) low impedance load components are provided, the output current of the AC power supply generator is adjusted to m/n times of the first current Io, such that each of the m load components has a second current thereon which equals to the first current, and the AC power supply generator outputs a second voltage which is reduced to n/m times of the first voltage.

The AC power supply generator in the lighting device may comprise a DC input voltage Vin and a resonance DC-AC converter. The resonance DC-AC converter may comprise: a half-bridge switching circuit formed of switching elements S1 and S2 for transforming the DC input voltage Vin into DC square waves; and a resonance groove formed of a resonance inductance Ls, a resonance capacitor Cs and a transformer Tr for receiving the DC square waves from the half-bridge switching circuit and transforming them into an AC current source to be output from the secondary side of the transformer Tr to supply power to the accessories and circuits on the right side.

It is apparent that those skilled in the art may conceive various modifications and variations to the present invention without departing from the spirit and the scope of the present invention. Accordingly, the present invention intends to cover the various modifications and variations to the present invention, provided that they are within the scope of the attached claims and their equivalents.

LIST OF REFERENCE SIGNS

The reference signs used herein are listed as below:
Vin: DC input voltage;
S1~S2: switching elements;
Cs: resonance capacitor;
Ls: resonance inductance;
Tr: transformer;
LED1~LED (n): LED groups;
Co1~Co (n): filter circuits;
P1~P (n): protection circuits;
D1~D (m): rectifier cells;
C1~C (m−1): current balancing cells;
Vab: output voltage of the AC power supply generator;
V1~V2: voltages on LED load 1 and LED load 2;
Vo: output voltage of the AC power supply generator when low impedance load components were not provided;
Vc1~Vc2: voltages on current balancing capacitors 1 and 2;
Io: current flowing through illuminant load components when low impedance load components were not provided.

What is claimed is:

1. A lighting device, comprising:
an AC power supply generator for generating an AC power source so as to supply power to other accessories and circuits of the lighting device;
m load components, wherein a first load component has one end electrically connected to the AC power supply generator and another end electrically connected to one end of a second load component at a first common connection point; an (i) th load component has one end electrically connected to one end of an (i−1)th load component at an (i−1)th common connection point and another end electrically connected to one end of an (i+1) th load component at an (i)th common connection point; an (m)th load component has one end electrically connected to one end of an adjacent (m−1)th load component at an (m−1)th common connection point and another end electrically connected to the AC power supply generator; and
(m−1) current balancing cells each for balancing the current flowing through two of the load components connected thereto, wherein a first current balancing cell is electrically connected between the AC power supply generator and the first common connection point, an (i−1)th current balancing cell is electrically connected between the AC power supply generator and the (i−1)th common connection point, an (i)th current balancing cell is electrically connected between the AC power supply generator and the (i)th common connection point, and an (m−1)th current balancing cell is electrically connected between the AC power supply generator and the (m−1)th common connection point;
wherein based on the polarities of the AC power supply generator, every two adjacent load components have opposite polarities and alternatively work in a positive cycle or a negative cycle of the AC power source; and
the m load components comprise (m−n) low impedance load components therein to reduce the voltage output from the AC power supply generator, wherein m, n and i are positive integers, and m≥3, m>n≥1, m>i>1.

2. The lighting device according to claim 1, wherein the m load components further comprise n illuminant load components therein, each of the low impedance load components has a low impedance load with an impedance value less than that of the illuminant load in any of the illuminant load components.

3. The lighting device according to claim 2, wherein each of the illuminant load components comprises:

an LED group formed of one or more LEDs connected in series with each other;

a filter circuit connected in parallel with the LED group; and a protection circuit connected in parallel with the LED group.

4. The lighting device according to claim 2, wherein each of the load components comprises a rectifier cell connected in series and in the same polarity with the illuminant load in the illuminant load component or the low impedance load in the low impedance load component.

5. The lighting device according to claim 4, wherein the rectifier cell is a rectifier diode.

6. The lighting device according to claim 1, wherein each of the load components has the same current flowing therethrough.

7. The lighting device according to claim 1, wherein the low impedance load in the low impedance load component is a wire or a forward conductive diode.

8. The lighting device according to claim 1, wherein each of the current balancing cells is a capacitor.

9. The lighting device according to claim 2, wherein the (m−n) low impedance load components are positioned on one side of the n illuminant load components, or the (m−n) low impedance load components are divided into two groups and respectively positioned on both sides of the n illuminant load components.

10. The lighting device according to claim 1, wherein the AC power supply generator is made of a resonance DC-AC converter.

11. The lighting device according to claim 10, wherein the resonance DC-AC converter comprises:

a half-bridge switching circuit formed of two switching elements connected in series with each other, for transforming the DC input voltage into DC square waves to be output from a common connection point of the two switching elements; and a resonance groove formed of a resonance capacitor, a resonance inductance and a transformer connected in series with each other, for receiving the DC square waves from the half-bridge switching circuit and transforming them into an AC current source to be output from a secondary side of the transformer to the load components.

12. The lighting device according to claim 2, wherein when the (m−n) low impedance load components were not provided, each of the n illuminant load components had a first current flowing therethrough, and the AC power supply generator output a first voltage; when the (m−n) low impedance load components are provided, the output current of the AC power supply generator is adjusted to m/n times of the first current, such that each of the m load components has a second current which equals to the first current, and the AC power supply generator outputs a second voltage which is reduced to n/m times of the first voltage.

13. A voltage reduction method for a lighting device, comprising steps of:

providing (m−n) low impedance load components in m load components to form the lighting device according to claim 1, wherein the low impedance load components are used to reduce the output voltage of the AC power supply generator in the lighting device.

14. The voltage reduction method for a lighting device according to claim 13, further comprising steps of:

providing n illuminant load components in the m load components, wherein when the (m−n) low impedance load components were not provided, each of the n illuminant load components had a first current flowing therethrough, and the AC power supply generator output a first voltage; when the (m−n) low impedance load components are provided, the output current of the AC power supply generator is adjusted to m/n times of the first current, such that each of the m load components has a second current which equals to the first current, and the AC power supply generator outputs a second voltage which is reduced to n/m times of the first voltage.

* * * * *